April 12, 1949.　　　　　　C. E. CADY　　　　　　2,467,185
ADJUSTMENT MEANS FOR OPTICAL COMPONENTS
OF PROJECTION TELEVISION RECEIVERS
Filed Jan. 11, 1947　　　　　　　　　　2 Sheets-Sheet 2

Inventor:
Charles E. Cady,
by Merton D. Morse
His Attorney.

Patented Apr. 12, 1949　　　　　　　　　　　　　　　　2,467,185

UNITED STATES PATENT OFFICE 2,467,185

ADJUSTMENT MEANS FOR OPTICAL COMPONENTS OF PROJECTION TELEVISION RECEIVERS

Charles E. Cady, Devon, Conn., assignor to General Electric Company, a corporation of New York Application January 11, 1947, Serial No. 721,555

2 Claims. (Cl. 178—7.5)

My invention relates to television receivers of the projection type and it has for its primary object to provide a new and improved arrangement of the optical components of such a receiver.

It is another object of my invention to provide a new and improved construction for a projection television receiver which facilitates the focussing of the cathode ray tube of the receiver and its associated lens.

A feature of the invention which is useful in the fulfilment of the foregoing objects consists of an arrangement in which the picture tube of the receiver and a correcting lens are insulatingly supported and adjustable as a unit with respect to the parabolic reflecting mirror of the optical system, the picture tube likewise being adjustable independently from the corrector lens through three mutually perpendicular directions.

The features which I desire to protect herein are pointed out with particularity in the appended claims. The invention itself, together with further objects and advantages thereof, may best be understood by reference to the following description taken in connection with the accompanying drawings in which Fig. 1 is a perspective view, partly in section, of the optical system of a projection television receiver; and Fig. 2, is an exploded view of the picture tube positioning and supporting device employed in the system of Fig. 1.

Figure 1:
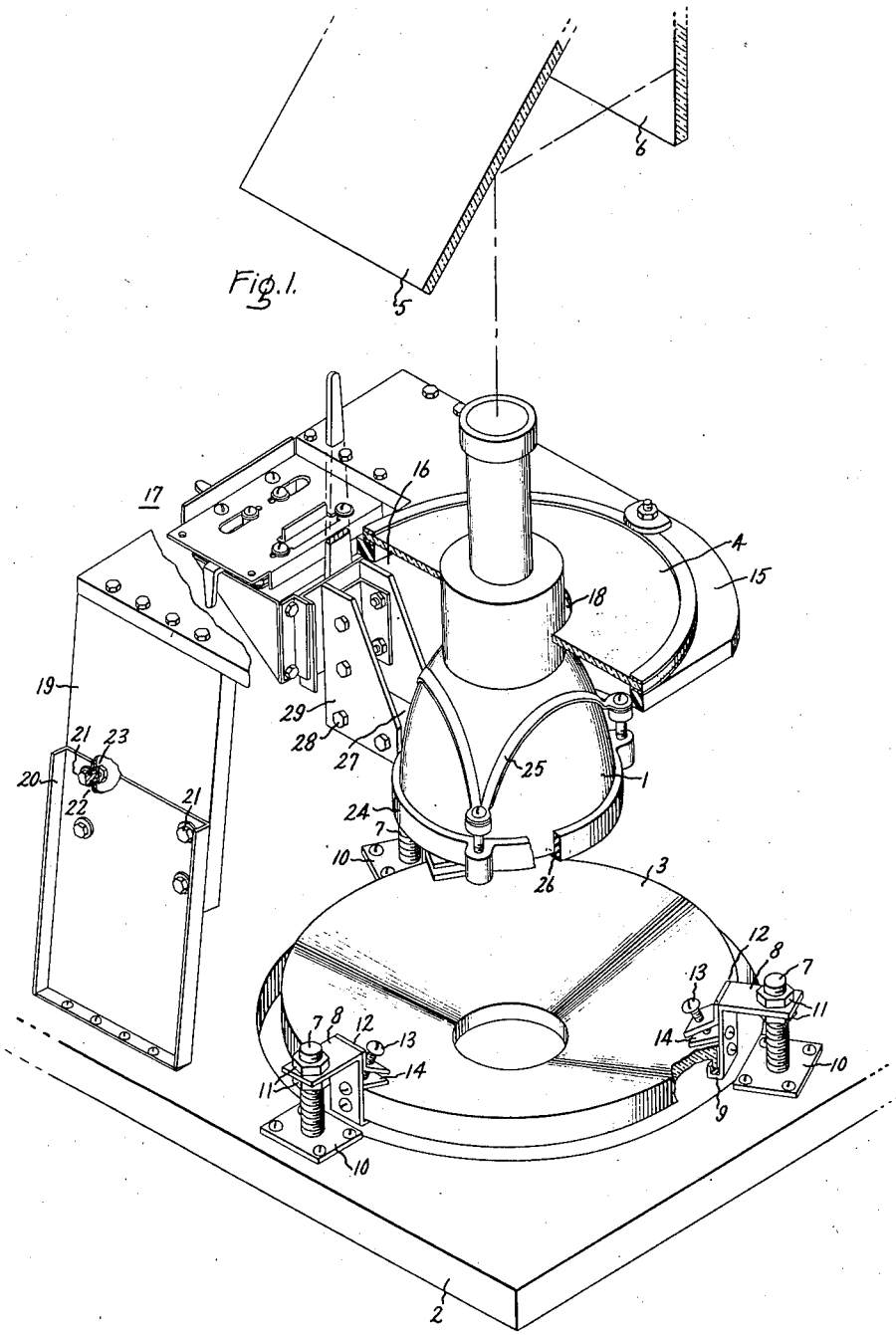
Figure 2:
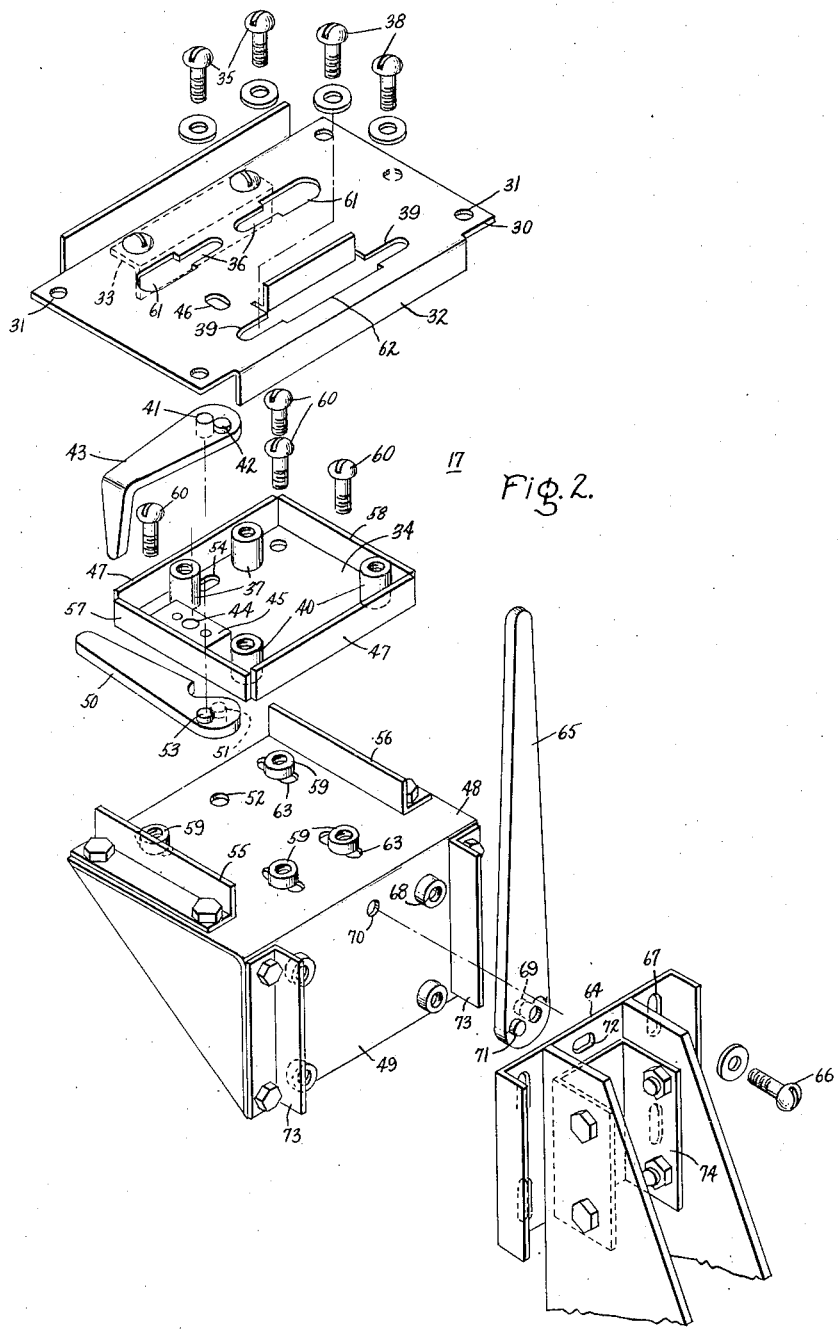

Referring to Fig. 1, I have there shown an optical system of the Schmidt type for use in a projection television receiver. The system comprises a cathode ray receiving or picture tube 1 which is mounted with its fluorescent end wall facing downward in the lower part of a cabinet having a base 2 with a spherical reflecting mirror 3 positioned below the picture tube and facing upward. Light from the face of the picture tube 1 is reflected upwardly from the mirror 3 through a correcting lens 4, which surrounds the neck of the tube, to a flat, inclined mirror 5 near the top of the cabinet. Light from the mirror 5 is thrown upon the rear surface of a viewing screen 6 which may comprise a frosted glass plate.

In order that the spherical reflector 3 may be adjusted to project light from the picture tube 1 directly toward the incline mirror 5, I provide an adjustable support for the mirror comprising three screw-threaded studs 7 spaced at equidistant points about the periphery of the mirror and each supporting a mirror clamp 8 having an arm 9 adapted to extend under the outer edge of the mirror 3. The studs 7 are supported on the bottom wall 2 of the television cabinet by means of mounting plates 10. The clamps 8 are individually adjustable in height by means of nuts 11 which cooperate with the threads on the studs 7. A screw plate 12 is attached, as by welding or by screws and nuts, to the clamp and provides means for threadedly engaging a screw 13 arranged to press against a clamp plate 14 lying on the upper surface of the mirror 3. It is apparent that, by adjustment of the nuts 11 on the respective studs, the beam of light reflected from the mirror 3 may be aligned to pass through the corrector lens 4 and centered with respect to the inclined mirror 5.

In order further to assist in centering the beam reflected from the mirror 3, I provide a unitary support for the picture tube 1 and the corrector lens 4 which comprises a supporting plate 15 formed of a suitable material. The corrector lens 4 is mounted in a position above a large aperture 16 in the plate 15 and the picture tube 1 is supported from the plate 15 by means of a manipulator or positioning device 17 so that the neck of the picture tube 1 projects through the aperture 16 in the plate 15 and a centrally located aperture 18 in the corrector lens 4. The plate 15 further is adjustable to a limited degree in height and in tilt with respect to a horizontal plane. To achieve such adjustment, the plate 15 is supported from the base 2 by means of overlapping legs 19, 20, the plate 15 being attached to the legs 19 and the legs 20 to the bottom wall 2 of the cabinet. For simplicity of the drawing only one set of these legs is shown. To provide the limited adjustment in height and in tilt, the legs 19, 20 are connected together by a plurality of bolt and nut arrangements 21 which pass through large clearance holes 22, 23, respectively, in the legs 19, 20. Clearance holes 22, 23 preferably are of sufficient size that a considerable tilt may be given to the corrector lens and picture tube assembly simply by adjusting the alignment of these holes.

I provide means for adjusting the focus of the picture tube 1 relative to the mirror 3 independently of the adjustment of the corrector lens 4 which comprises the manipulator or positioning device 17 from which the picture tube is supported by means of a tube holder 24 and three tube straps 25. The tube holder 24 preferably is formed of a suitable insulating material, such as a molded phenolic resin, and the straps 25 are utilized to maintain the tube 1 firmly pressed against a circular seat 26 provided by a shouldered aperture in the holder 24. The holder 24 has an arm portion 27 which is fastened by means of bolts 28 to supporting plates 29 attached to the manipulator 17 now to be described.

The manipulator or positioning device 17 may best be explained by reference to the exploded view shown in Fig. 2. The manipulator there illustrated comprises a supporting or mounting plate 30 provided with holes 31 along two of its sides for attachment to the plate 15 described in connection with Fig. 1. The mounting plate 30 is provided with a downwardly extending portion 32 at its front edge and a guide angle 33 attached to its lower surface at its rear edge to form a pair of guides or ways for a movable horizontal plate 34 positioned below the mounting plate 30. The horizontal plate 34 is mounted from the plate 32 by means of screws 35 which pass through slots 36 in plate 30 to engage threaded spacers 37 suitably attached to the upper surface of the plate 34, as by welding. The horizontal plate 34 is further supported from the mounting plate 30 by means of additional screws 38 which pass through slots 39 in plate 32 to engage other spacers 40, likewise attached to the upper surface of plate 34. I provide means for moving the horizontal plate 34 in a direction parallel with the slots 36, 39 and comprising a cam comprising studs 41, 42 attached to opposite sides of a lever 43 and engaging, respectively, a recess or hole 44 in a bearing block 45 and a slot 46 in mounting plate 30. Studs 41, 42 are positioned on opposite sides of the center line of the lever arm 43. Bearing block 45 is attached to the upper surface of plate 34. As the lever arm is rotated through the rotating action of stud 41 in the bearing hole 44, stud 42 functions as a cam which moves in the slot 46, tending to move the horizontal plate 34 in a direction parallel with the slots 36, 39, the portion 32 and the guide angle 33 functioning as ways to permit movement of the horizontal plate 34 in a direction longitudinal with the members 32, 33 and preventing movement in a direction transverse to these members. To effect such longitudinal motion, the plate 34 is provided with upturned edges 47 which slide against the members 32, 33.

In order to obtain an adjustment of the position of the supported cathode ray tube in a direction transverse to that obtained through the operation of lever 43 with its associated cam and follower, I provide an angular bracket member comprising a plate 48 and a depending plate portion 49 disposed at right angles to the plate 48. Movement between the plate 48 and the plate 34 is effected by means of a lever 50 having a stud 51 extending downwardly from the lower surface of lever 50 and arranged to rotate in a bearing hole 52 provided in the plate 48 and a second stud 53 which extends upwardly on the opposite surface of lever 50 and is eccentric to the stud 51. The stud 53 is adapted to fit into a slot 54 provided in plate 34. I provide ways or guides for confining the motion of plate 34 produced through the operation of lever 50 to a direction perpendicular to that produced through the operation of lever 43 comprising guide angles 55, 56 attached to the upper surface of plate 48 and engaging vertical ends 57, 58 provided on plate 34. The plate 34 is maintained in spaced relation from plate 48 by means of four spacers 59 which have clearance holes for the screws 60 extending through suitable apertures provided in plate 34. Access to the screws 60 through the mounting plate 30 for adjustment purposes is provided by enlarged openings 61 provided at the ends of slots 36 in plate 30, as well as an opening 62 between the slots 39 in plate 30. Each of the spacers 59 is positioned above a corresponding slot 63 provided in plate 48 and is confined to movement longitudinally of these slots by means of screws 60. Washers and nuts (not shown) on the end of screws 60 and underneath plate 48 serve to support and fasten the plate.

In order that the supported cathode ray tube may be moved independently in a direction transverse to the directions provided through the operation of levers 43, 50, I utilize the depending surface 49 as a means for supporting a vertical slide 64 and produce movement between the members 49, 64 by means of a third lever 65. The slide 64 is supported from plate 49 by means of four screws 66 which extend through vertical slots 67 in slide 64 to engage spaces 68 affixed in any suitable manner to the plate 49. Movement between the plate 49 and slide 64 through the operation of lever 65 is effected by means of a first stud 69 on one side of the lever which is arranged to rotate in a bearing hole 70 provided in plate 49 and a second stud 71 eccentric to and located on the opposite side of lever 65 from stud 69 and arranged to fit in a slot 72 provided in slide 64. Relative movement between the plate 49 and slide 64 is confined to the vertical direction by means of vertical guide angles 73 attached to plate 49 and arranged to receive the side portions of slide 64. The plates 29 for supporting the tube holder 24 are, themselves, supported from the vertical slide 64 by attachment to a vertical bracket 74 which, in turn, is attached to the outer surface of slide 64.

In the operation of the manipulator 17 to effect focussing of the picture tube 1 with respect to the spherical mirror 3, adjustment in a vertical direction is obtained through the operation of lever 65 to move the vertical slide 64 relative to the plate 49. Adjustment in a position longitudinal of the arm 27 of the tube holder 24 is provided through the operation of lever 50 to cause the plate 48 to move relative to the plate 34. Similarly, movement in a third direction transverse to the directions of movement produced by operation of the levers 65, 50 is effected by operation of lever 43 to move plate 34 relative to plate 30. After the focussing of the cathode ray tube in any one of these directions is obtained, the cathode ray tube may be locked against further movement in that direction simply by tightening of the screws which permit movement in that direction. Thus after focussing in the vertical direction is obtained, tightening of screws 66 is effective to prevent further movement between vertical slide 64 and plate 49. Similarly, tightening of the screws 60 and screws 35, 38 prevents movement, respectively, between the plates 48, 34 and plates 34, 30.

In the alignment of the optical system of the projection television receiver utilizing my invention, preferably alignment is first obtained by adjustment of the spherical mirror 3 to effect centering of the beam of light projected from the picture tube 1 upon the inclined mirror 5. Thereafter, the plane of the corrector lens 4 is made perpendicular to the optical axis by adjusting both the height of the corrector lens and its angle of inclination with a horizontal plane by means of the bolts 21 and the large clearance holes 22, 23. This last adjustment, of course, is effective likewise to change the position of picture tube 1. Similarly, the cathode ray tube is adjusted in any or all of three mutually perpendicular directions by means of the levers 43, 50, 65 and locked in adjustment positions by means of the previously-mentioned locking structures.

An important advantage of my improved arrangement of the optical system of a projection television receiver is that sufficient degrees of motion are permitted between all of the optical components so that correct focussing may be obtained quickly and accurately. Furthermore, whenever it is necessary to change the picture tube of the receiver, such change may be readily effected simply by moving the corrector lens 4 and the straps 25. When a new picture tube is placed in position, it may be rapidly focussed by means of three simple levers.

Another advantage of my improved construction is that it provides complete and effective insulation of the picture tube with its required high potential connections from all of the elements required to adjust the focus of the tube.

While I have shown and described my invention as applied to a particular device, it will be obvious to those skilled in the art that changes and modifications may be made without departing from my invention. I, therefore, aim in the appended claims to cover all such changes and modifications as fall within the true spirit and scope of my invention.

What I claim as new and desire to secure by Letters Patent of the United States is:

1. In a projection television receiver of the type having a cathode ray tube, a mirror positioned opposite one end of said tube and a correcting lens, a unitary structure for supporting said cathode ray tube, said correcting lens and said mirror in optical alignment comprising, a lower member supporting said mirror and having means for adjusting the angle of said mirror relative to said lower member, an upper member supporting said correcting lens, positioning means supported by said upper member, a holder for the cathode ray tube supported by said positioning means, said positioning means comprising a plurality of lever actuated members for adjusting said holder independently of said lens in three mutually perpendicular directions, said upper member being supported by and adjustable in angle relative to said lower member whereby the optical axis of said lens and said cathode ray tube may be aligned with the optical axis of said mirror when said mirror is in adjusted position.

2. In a projection television receiver of the type having a cathode ray tube, a spherical mirror positioned opposite one end of said tube, and an apertured correcting lens surrounding the neck of said tube, a unitary structure for supporting said cathode ray tube, said correcting lens, and said mirror in optical alignment comprising an apertured base member having a plurality of spaced upwardly extending leg members attached thereto, means for supporting said spherical mirror within said aperture and including means for adjusting the angle of said mirror relative to said base member, a plate member supporting said correcting lens and having a plurality of spaced downwardly extending leg members attached thereto, positioning means supported by said plate member, a holder for the cathode ray tube supported by said positioning means, said positioning means comprising three plates slidably engaged for mutually perpendicular motions and three levers respectively associated therewith for imparting said mutually perpendicular motions to said plates to adjust said holder independently of said lens and said mirror in three mutually perpendicular directions, said upwardly extending leg members being adjustably held in overlapping relation to said downwardly extending leg members to support said plate member in adjustable position relative to said base member whereby the optical axis of said correcting lens and cathode ray tube may be aligned with the optical axis of said mirror when said mirror is in adjusted position.

CHARLES E. CADY.

REFERENCES CITED

The following references are of record in the file of this patent:

UNITED STATES PATENTS

| Number | Name | Date |
| --- | --- | --- |
| 1,338,818 | Dennington | May 4, 1920 |
| 1,658,239 | Godley | Feb. 7, 1928 |
| 1,863,300 | Dina | June 4, 1932 |
| 1,989,336 | Pollard | Jan. 29, 1935 |
| 1,991,861 | May | Feb. 19, 1935 |
| 2,273,801 | Landis | Feb. 17, 1942 |
| 2,404,943 | Beshgetoor | July 30, 1946 |
| 2,415,211 | Law | Feb. 4, 1947 |
| 2,424,513 | Stephen | July 22, 1947 |